Oct. 25, 1966　　W. E. SCHWERDTFEGER　　3,280,965
MOTOR MOUNT ASSEMBLY

Filed April 19, 1965　　　　　　　　　　　　3 Sheets-Sheet 1

Inventor
Wilbur E. Schwerdtfeger

Ralph Alwy
Attorney

Oct. 25, 1966  W. E. SCHWERDTFEGER  3,280,965
MOTOR MOUNT ASSEMBLY
Filed April 19, 1965  3 Sheets-Sheet 2

Inventor
Wilbur E. Schwerdtfeger

Ralph Alvey
Attorney

Oct. 25, 1966   W. E. SCHWERDTFEGER   3,280,965
MOTOR MOUNT ASSEMBLY
Filed April 19, 1965   3 Sheets-Sheet 3
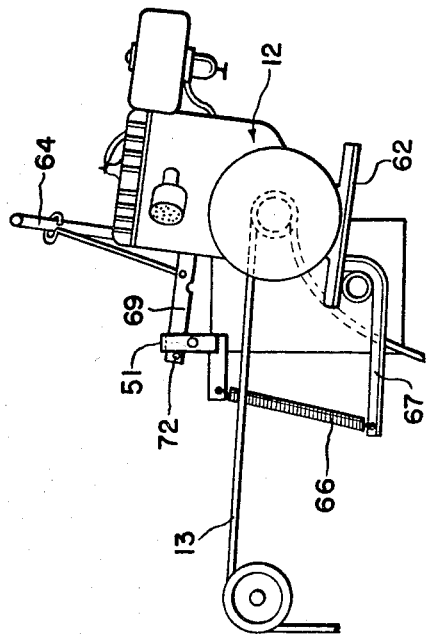
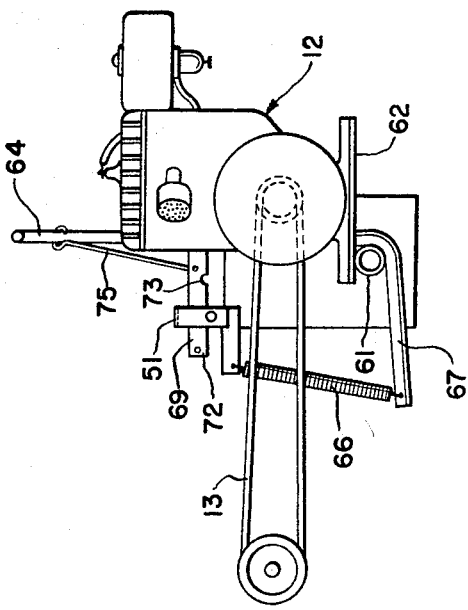
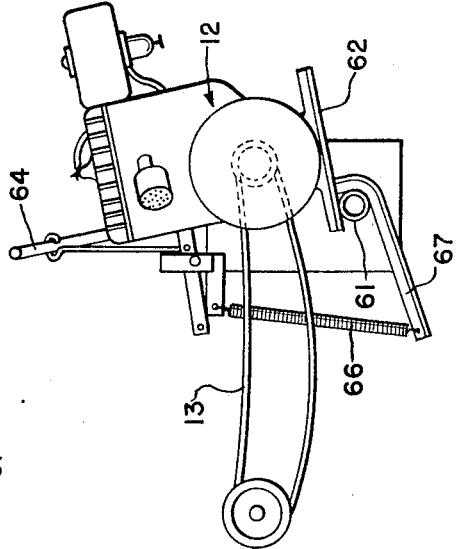
Inventor
Wilbur E. Schwerdtfeger
Ralph Alvey
Attorney

United States Patent Office 3,280,965
Patented Oct. 25, 1966

3,280,965
MOTOR MOUNT ASSEMBLY
Wilbur E. Schwerdtfeger, Western Springs, Ill., assignor to International Harvester Company, a corporation of Delaware
Filed Apr. 19, 1965, Ser. No. 449,154
9 Claims. (Cl. 198—233)

This invention pertains to a motor mount assembly for an inclined material conveyor such as a bale elevator. In particular, the invention is a combination engine mount, belt tightener, and clutch. The components of the assembly keep the engine level, the drive belt tight, and permit engagement and disengagement of the engine and drive belt.

The desire to mechanize bale handling on farms in recent years has stimulated interest in portable bale elevators for lifting bales to the barn loft. Certain problems are, however, involved in the use of such elevators. For one thing, portable bale elevators are moved around and set at different angles of incline. If the elevator is powered by a gasoline engine, means must be provided for keeping the oil in the engine crankcase level regardless of the angle of incline of the elevator, so as not to starve engine parts of lubrication. Also, if the elevator uses a belt drive, means must be provided for keeping the belt tight regardless of any stretching that occurs from use. Provision must also be made for the use of various length replacement belts when the original belt is worn out, as a belt of the same length as the old one may not be available. Other functions, such as clutching, must also be provided for in the drive system. Possible solutions to these problems are, however, limited because of the need to keep the drive system simple and inexpensive for use on farms.

OBJECTS

The object of this invention is in general to overcome each of the above problems. One particular object is to provide means for keeping the gasoline engine reasonably level over a wide range of angles of incline of the bale elevator, whether the engine is clutched or declutched. Another particular object is to provide means for keeping the drive under tension regardless of minor variations in the forces acting on the belt and regardless of stretching of the belt. A further particular object is the provision of means permitting a wide range of belt lengths to be employed. Other particular objects include the provision of a combined clutch and belt tightener embodying a safety feature to prevent loss of control over the level of the engine if the drive belt breaks; and the provision of a combined clutch device and belt tightener using a spring force and the engine weight to affect the clutching and belt tightening action.

DRAWINGS

The preferred mode of the novel motor mount assembly comprising this invention is shown in the drawings, where:

FIG. 3 is a side view of the invention, showing the relationship of the parts thereof during normal operation;

FIG. 4 is a view similar to FIG. 3, showing the engine disengaged from the belt drive;

FIG. 5 is a view similar to FIG. 3, showing the engine arrested by the emergency stop after the drive belt has broken.

DESCRIPTION

Figure 1:
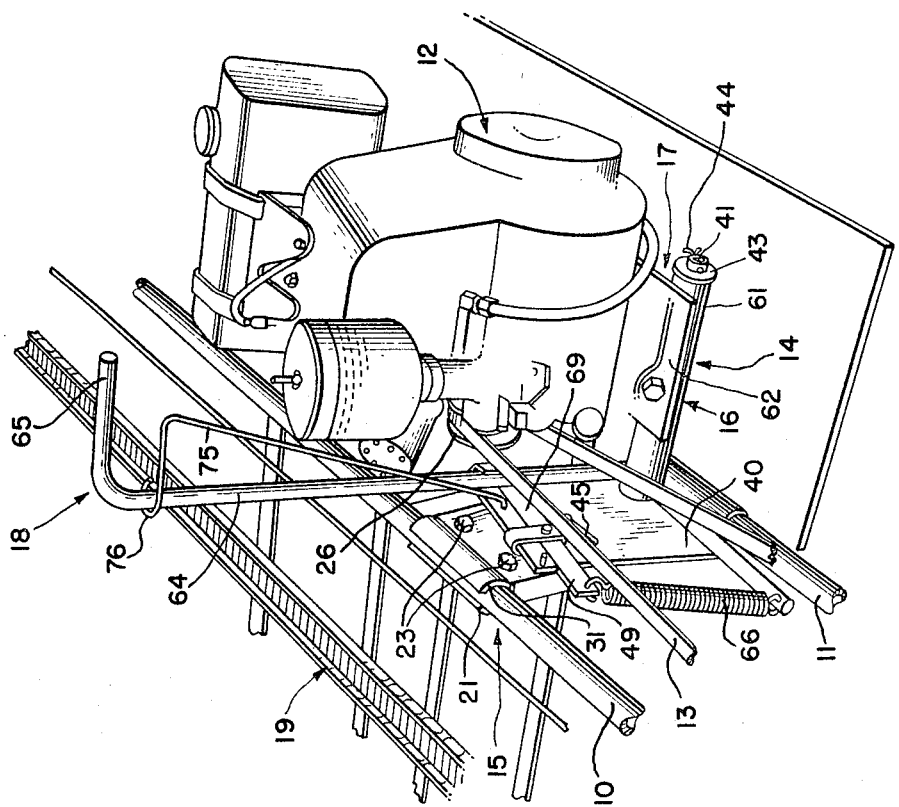
FIG. 1 shows a portion of a bale elevator installation and the location thereon of the present invention.

The motor mounting assembly 14 (FIG. 1) forming the present invention is used to mount a motor 12 on the side rails 10 and 11 of a portable bale elevator similar to that shown in U.S. Patent 2,647,616. The motor 12, which may be either an electric or gasoline motor, drives a belt 13 that transmit power to the bale elevator conveyor chain 19.

Motor mount assembly 14 comprises (FIG. 2) a base bracket unit 15 for attaching the assembly to the side of a bale elevator, a levelling unit 16 for setting the engine level, a belt tightener unit 17 for keeping drive belt 13 taut, and a clutch unit 18 for engaging and disengaging the motor 12 from the drive belt 13. Each of the units 15, 16, 17, and 18 contributes to the effectiveness of the motor mount assembly. Bracket unit 15 permits the assembly to be positioned at different points along the elevator, so that different lengths of drive belts 13 can be used. Levelling unit 16 permits the engine 12 to be set level when the angle of incline of the elevator is changed, so that the engine lubrication supply is kept properly distributed. Belt tightener unit 17 increases the efficiency of the drive by keeping the belt 13 taut and by taking up slack as the belt stretches from use. Clutch unit 18 provides control over the conveyor chain 19 without stopping engine 12.

The base bracket unit 15 (FIG. 2) comprises an inner bracket plate 20 and an outer bracket plate 30. The ends of plates 20 and 30 are formed into semi-cylindrical clamping elements 21, 22, 31, and 32. These clamping elements seat on the tubular pipe rails 10 and 11 of the bale elevator. Four bolt holes 23 in the inner plate 20 and four bolt holes 33 in the outer plate 30 are provided for four corresponding bolts 36 and nuts 37 that fasten the bracket unit 15 to the elevator. The function of the holes 24, 25, 34 and 35 is described below.

The levelling unit 16 (FIG. 2) comprises a levelling plate 40 having attached to it a pivot member support means 41 made of pipe, which extends through a hole in levelling plate 40 and is welded or otherwise secured thereto. A portion 56 of the pivot member support means 41 on the far side of the late 40 serves as a pivot mounting for plate 40 on the base bracket 15. The portion 56 fits freely through hole 34 of end plate 30 and hole 24 of end plate 20 for pivotal movement of the levelling plate 40 relative to the bracket 15 about the axis of the pivot member support means 41. Washer 54 fits over the portion 56, cotter pin 54 being inserted through a hole in portion 56 to hold the support means 41 on the base bracket 15.

Levelling unit 16 is secured in a selected pivot position by means of the elongated slot 45 in levelling plate 40 and the aligned slots 25 and 35 in plates 20 and 30, respectively, of the base bracket 15. Slot 45, which slopes at 45 degrees for optimum pivoting range, overlaps slots 25 and 35 at all pivot positions of plate 40 within the length of slot 45. To fix plate 40 in a pivot position, bolt 46 is inserted in slots 45, 35 and 25 and secured with washer 47 and nut 48.

The belt tightening unit 17 (FIG. 2) comprises pipe pivot member 61, a motor support plate 62 welded or otherwise secured to the member 61, an L-shaped lever arm 64 welded to the member 61, a spring arm 49 attached to the levelling plate 40, and a coil tension spring 66. Pivot member 61 is journalled on the pivot member support means 41, the hole 42 in support means 41 being located beyond the end of member 61 and the washer 43, which fits onto the end of the pivot member 61. Cotter pin 44 fits into hole 42 in member 41 to hold the washer 43 and the pivot member 61 on the support 41. Spring 66 joins the lower end of lever arm 64 to spring arm 49, the lower, hooked end of spring 66 fitting into hole 67 of lever arm 64 and the upper, hooked end of spring 66 fitting into hole 50 in arm 49. Motor 12 is mounted on plate 62 by means of nuts and bolts inserted through the holes 63 at the four corners of plate 62.

Figure 2:
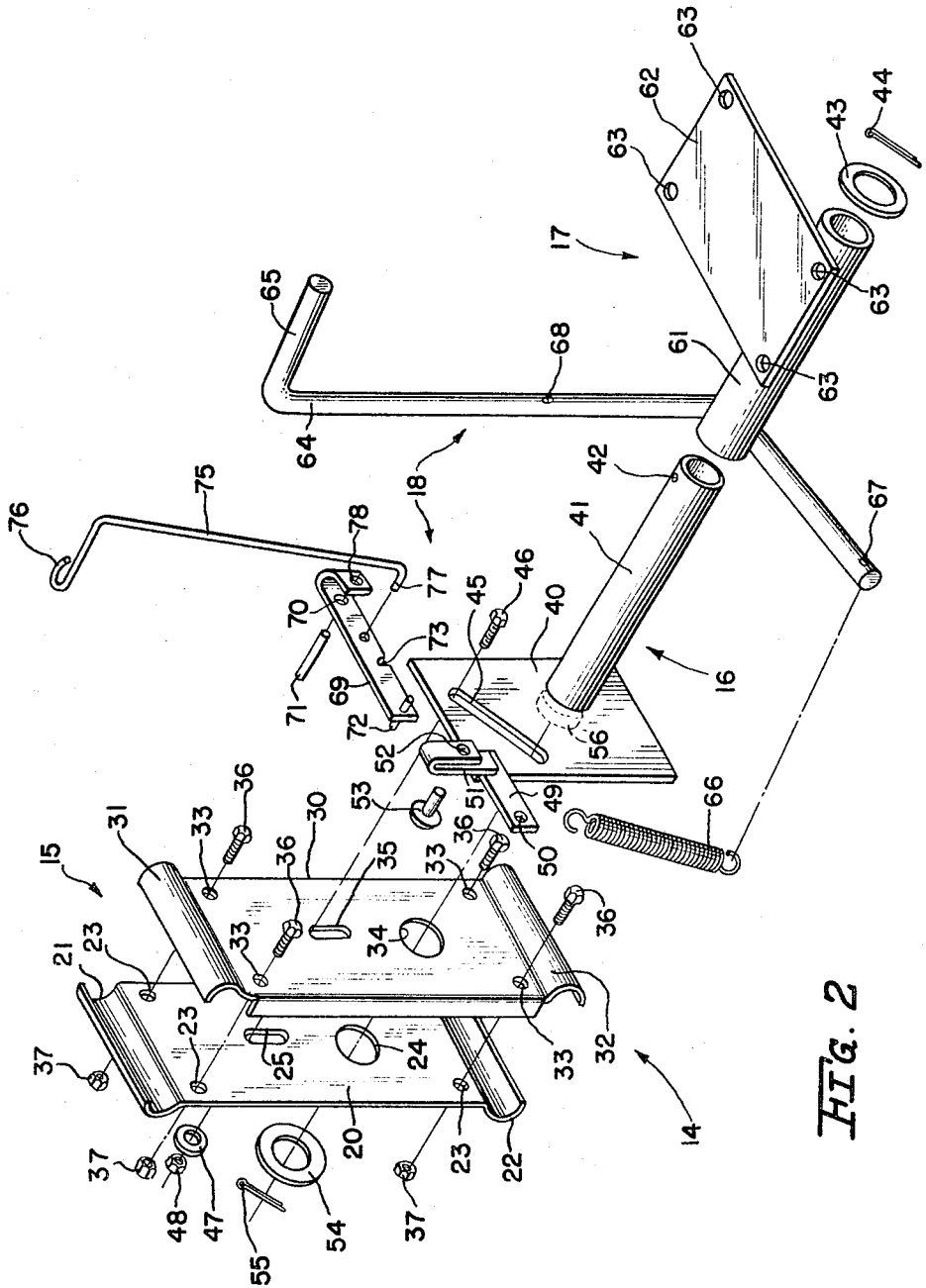
FIG. 2 is an exploded view of the motor mount assembly, showing the relationship of the various parts thereof.

Since plate 62 projects to one side of the axis of the pivot member 61, the weight of the plate 62 plus the weight of motor 12 creates a movement about the axis of member 61 tending to rotate plate 62 clockwise relative to FIG. 2, thereby forcing the drive pulley 26 (FIG. 1) of motor 12 into firm contact with the drive belt 13. Under normal operating conditions, tension spring 66 is extended, so that it also exerts a clockwise movement relative to FIG. 2 on the lower end of lever 64, and likewise tends to hold the drive pulley 26 of motor 12 in contact with belt 13.

The clutch unit 18 (FIG. 2) comprises generally the L-shaped lever 64 welded or otherwise attached to the member 61, the control bar guide 51 attached to the leveling plate 40, the control bar 69, and the release rod 75. Control bar 69 slides within the guide 51, with the stop pin 72 on bar 69 being located to the left of guide 51. Stop pin 53 fits into the holes 52 in the guide 51, with the bar 69 being located above pin 53. The hooked end of bar 69 is secured to lever 64, the pins 71 extending through the holes 70 and 78 in bar 69 and through hole 68 in lever 64. Release rod 75 is secured to lever 64 by means of the loop 76, which encircles lever 64, and is secured to bar 69 by means of bent portion 77 at its lower end, which is inserted in hole 74 in bar 69.

The operation of the clutch unit 18 is shown in FIGS. 3-5. Under normal operating conditions (FIG. 3), the weight of the motor 12 and of the plate 62 and the action of spring 66 produce a clockwise moment relative to FIG. 3 which keeps pulley 26 of motor 12 in contact with drive belt 13. When the drive is engaged, in other words, the function of the clutch unit and the belt tightener unit overlap. Bar 69 rests on top of pin 53 at some point on bar 69 intermediate stop pin 72 and notch 73.

To disengage drive pulley 26 of motor 12 from drive belt 13 (FIG. 4), lever 64 is moved counterclockwise, until notch 73 on bar 69 overlaps pin 53 and the weight of bar 69 causes it to drop, locating pin 53 in notch 73. The forces tending to rotate member 61 clockwise also force notch 73 into firm contact with pin 53. To release the clutch and return the motor to engaged or drive position, release rod 75 is raised, thereby lifting bar 69 from pin 53. Member 61 is then free to rotate clockwise in response to the weight of plate 62, motor 12, and the action of spring 66.

Under emergency conditions, as where drive belt 13 breaks (FIG. 5), stop pin 72 at the end of bar 69 prevents member 61 in motor 12 from rotating too far, e.g. to a vertical positon. Stop pin 72 butts against guide 51, thereby preventing further travel of bar 69. Bar 69 in turn brakes the lever 64, which prevents further rotation of member 61.

Thus, a simple and versatile motor mounting assembly is provided. By arranging two concentric members and three plates in the manner described above, a motor mount assembly is provided having a levelling action, a belt tightening action, a clutching action and the ability to use various lengths of belts.

While only the preferred mode of the present invention has been described, the invention is by no means limited to that mode, but embraces, as well, all equivalent forms that fall within the spirit and scope of the attached claims. Specific details, where described, are intended as illustrations only and not as limitations of the invention.

What is claimed is:
1. A motor mount assembly for an inclined material transfer device, comprising: a base bracket for attaching said motor mount assembly to said inclined material transfer device, a levelling plate including pivot member support means pivotally mounting said levelling plate on said base bracket, fastening means securing said levelling plate in a selected pivot position relative to said base bracket, said pivot member support means including a generally cylindrical bearing surface, a pivot member including a generally cylindrical bearing surface, said pivot member support means and said pivot member being concentric to one another with said bearing surface of said pivot member support means supporting said pivot member on said bearing surface thereof for rotation of said pivot member relative to said pivot member support means, and means on said pivot member for supporting a motor.

2. A motor mount assembly as recited in claim 1, wherein: said pivot member support means is a pin-like element attached to said levelling plate, and said pivot member is a sleeve journalled on said pivot member support means.

3. A motor mount assembly as recited in claim 1, wherein: means for limiting the angular pivotal movement of said pivot member is joined to said pivot member, and other means for limiting the angular pivotal movement of said pivot member is joined to said levelling plate.

4. A motor mount assembly as recited in claim 1, including: a clutch unit comprising a clutch lever joined to said pivot member, a control bar guide on said levelling plate, said guide including a guideway, a control bar joined to said clutch lever and extending into said guideway, a stop element on said control bar for limiting travel of said bar through said guideway and the angular pivotal movement of said pivot member, locking means on said control bar and said guide for securing said pivot member in a predetermined angular position.

5. A motor mount assembly as recited in claim 4, including: a spring arm attached to said levelling bracket, and a spring joining said spring arm to said pivot member.

6. A motor mount assembly as recited in claim 2, including: a clutch unit comprising a clutch lever joined to said pivot member, a control bar guide on said levelling plate, said guide including a guideway, a control bar joined to said clutch lever and extending into said guideway, a stop element on said control bar for limiting travel of said bar through said guideway and the angular pivotal movement of said pivot member, locking means on said control bar and said guide for securing said pivot member in a predetermined angular position.

7. A motor mount assembly as recited in claim 6, including: a spring arm attached to said levelling bracket, and a spring joining said spring arm to said pivot member.

8. A motor mount assembly as recited in claim 5, wherein: said base bracket includes clamping means for attaching said bracket to said material conveyor at alternate points therealong.

9. A motor mount assembly as recited in claim 7, wherein: said base bracket includes clamping means for attaching said bracket to said material conveyor at alternate points therealong.

References Cited by the Examiner
UNITED STATES PATENTS

| | | | |
|---|---|---|---|
| 2,332,729 | 10/1943 | Klosterman | 198—233 X |
| 2,515,988 | 7/1950 | Conrad | 198—203 |
| 2,831,566 | 4/1958 | Beldin et al. | 198—203 X |
| 3,156,341 | 11/1964 | Wilcoxen | 198—233 |

EVON C. BLUNK, *Primary Examiner.*

R. J. HICKEY, *Assistant Examiner.*